(12) United States Patent
Topf et al.

(10) Patent No.: US 9,856,011 B2
(45) Date of Patent: Jan. 2, 2018

(54) METHOD FOR THE JOINING OF WINGS OR CONTROL SURFACES TO AN AIRPLANE FUSELAGE

(71) Applicant: The Boeing Company, Chicago, IL (US)

(72) Inventors: Richard P. Topf, Chicago, IL (US); Jonathan D. Embler, Chicago, IL (US); Thomas R. Pinney, Chicago, IL (US)

(73) Assignee: The Boeing Company, Chicago, IL (US)

( * ) Notice: Subject to any disclaimer, the term of this patent is extended or adjusted under 35 U.S.C. 154(b) by 126 days.

(21) Appl. No.: 14/819,792

(22) Filed: Aug. 6, 2015

(65) Prior Publication Data

US 2017/0036751 A1    Feb. 9, 2017

(51) Int. Cl.
| | |
|---|---|
| *B64C 1/06* | (2006.01) |
| *B64C 1/38* | (2006.01) |
| *B64C 1/26* | (2006.01) |
| *B64C 9/02* | (2006.01) |
| *B64C 30/00* | (2006.01) |

(52) U.S. Cl.
CPC ............ *B64C 1/38* (2013.01); *B64C 1/26* (2013.01); *B64C 9/02* (2013.01); *B64C 30/00* (2013.01)

(58) Field of Classification Search
CPC ....... B64C 25/10; B64C 25/20; B64C 25/405; B64C 2025/125; B64C 25/02; B64C 25/00
See application file for complete search history.

(56) References Cited

U.S. PATENT DOCUMENTS

| 2,690,888 | A | * | 10/1954 | Hawkins, Jr. | B64C 25/14 244/102 R |
|---|---|---|---|---|---|
| 3,759,468 | A | * | 9/1973 | Boehringer | B64C 25/34 244/102 R |
| 4,228,975 | A | * | 10/1980 | Sealey | B64C 25/14 244/102 R |
| 4,720,063 | A | * | 1/1988 | James | B64C 25/14 244/102 R |
| 5,280,889 | A | * | 1/1994 | Amil | F16F 1/02 248/618 |

(Continued)

*Primary Examiner* — Assres H Woldemaryam
(74) *Attorney, Agent, or Firm* — McDonnell Boehnen Hulbert & Berghoff LLP

(57) ABSTRACT

Methods of joining a first aerostructure part with a second aerostructure part are disclosed, for example, methods of joining an airplane wing or control surface to an airplane fuselage or joining fins to a rocket body. The method comprises aligning a plurality of connection elements in a linear array within the second aerostructure part, wherein the connection elements comprise a plurality of flexible connection elements and at least one rigid connection element, and attaching the first aerostructure part to the second aerostructure part at a plurality of connection points with the plurality of connection elements. The second aerostructure part expands linearly at a greater rate when exposed to heat than the first aerostructure part resulting in a difference in linear distance between the first aerostructure part and the second aerostructure part and the flexible connection elements are configured to flex to accommodate for this linear distance difference.

14 Claims, 3 Drawing Sheets

(56) References Cited

U.S. PATENT DOCUMENTS

| | | | | |
|---|---|---|---|---|
| 6,012,680 | A * | 1/2000 | Edberg | B64G 1/641 |
| | | | | 244/173.2 |
| 6,042,055 | A * | 3/2000 | Messinger | B64C 1/38 |
| | | | | 244/131 |
| 6,629,688 | B1 * | 10/2003 | Sebert | F16F 1/02 |
| | | | | 267/147 |
| 6,758,386 | B2 * | 7/2004 | Marshall | F16L 25/0072 |
| | | | | 228/120 |
| 7,850,387 | B2 * | 12/2010 | Chapin | B64C 1/12 |
| | | | | 403/286 |
| 8,128,025 | B2 * | 3/2012 | Rawdon | B64C 1/08 |
| | | | | 244/117 R |
| 8,328,453 | B2 * | 12/2012 | Keith | F01D 25/243 |
| | | | | 403/30 |
| 9,618,072 | B2 * | 4/2017 | Thuswaldner | F16F 7/00 |
| 2006/0237584 | A1 * | 10/2006 | Hinton | B64C 25/12 |
| | | | | 244/102 R |
| 2009/0202825 | A1 * | 8/2009 | Marx | C08J 3/246 |
| | | | | 428/343 |
| 2011/0089292 | A1 * | 4/2011 | Williams | B64C 1/26 |
| | | | | 244/131 |
| 2014/0332632 | A1 * | 11/2014 | Helmer | B64G 1/641 |
| | | | | 244/173.2 |
| 2015/0097076 | A1 * | 4/2015 | Lakic | B64C 3/38 |
| | | | | 244/46 |
| 2017/0015402 | A1 * | 1/2017 | Lakic | B64C 1/26 |

\* cited by examiner

METHOD FOR THE JOINING OF WINGS OR CONTROL SURFACES TO AN AIRPLANE FUSELAGE

TECHNICAL FIELD

The present disclosure relates generally to methods of joining two aerostructures, for example, joining wings or control surface structures to an airplane fuselage or joining fins to a rocket body. Specifically, this disclosure relates to using flexible connection elements to join aerostructures with different thermal linear expansion rates, different thermal environments, or different thermal management approaches.

BACKGROUND

Vehicles that travel at hypersonic speeds need an airframe designed to withstand thermal loads as well as structural loads. This is especially true for airframes designed with hot structure, whereby a portion of the vehicle structure is allowed to get hot, as opposed to a more traditional approach of using thermal protection materials on the vehicle surface. Structural configurations for wing-to-body joints that are typically used for aircraft are not appropriate for a vehicle with a hot structure wing. This is because the rigid connection of a traditional joint cannot accommodate the strain induced by thermal expansion, especially along the chord of the wing.

In most aerostructures, one or more primary load bearing members called spars create just a few paths to react to primary bending and shear loads. The spars may pass through the fuselage, under or over the fuselage, or connect directly to the fuselage. Regardless of position, a rigid connection is used to transfer wing loads into the fuselage. Typically, hypersonic vehicles are designed with parasitic thermal protection systems (TPS) on the skins of the vehicle that minimize internal structure temperature, thus enabling the traditional structural approach. TPS adds significant weight to the vehicle. It also adds cross sectional area to the vehicle and thickness to the wings in particular, which add significant drag forces at hypersonic speeds. A hot structure wing, whereby the wing is allowed to get hot from aerodynamic heating, would thus be much more efficient due to lower weight and reduced thickness. However, the thermal growth of the wing relative to the fuselage at extreme temperatures would overstress a traditional rigid connection, making it infeasible.

Thus, there is a need for a method of joining hot structure wings or control surfaces to the fuselage without overstressing the connection when relative thermal growth exists between structural members.

SUMMARY

According to an example embodiment, a method of joining a first aerostructure part with a second aerostructure part is provided. The method comprises aligning a plurality of connection elements in a linear array within the second aerostructure part, wherein the connection elements comprise a plurality of flexible connection elements and at least one rigid connection element. The method further comprises attaching the first aerostructure part to the second aerostructure part at a plurality of connection points with the plurality of connection elements. The second aerostructure part expands linearly at a greater rate when exposed to heat than the first aerostructure part resulting in a difference in linear distance between the first aerostructure part and the second aerostructure part, and wherein the flexible connection elements are configured to flex to accommodate for this linear distance difference.

According to another example embodiment, a method of joining an airplane wing with an airplane fuselage is provided. The method comprises aligning a plurality of flexible plates and one rigid connection element in the airplane wing, such that the thinnest part of each flexible plate is aligned with a chordwise direction of the airplane wing and the length of each flexible plate is aligned with a spanwise direction of the airplane wing. The method further comprises attaching the wing to the fuselage with the flexible plates and the rigid connection element at a plurality of connection points, wherein the rigid connection element connects the wing to fuselage at a fixed location. The flexible plates flex to accommodate chordwise expansion of the airplane wing, and wherein the flexible plates resist vertical shear and bending moment.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the example embodiments are set forth in the appended claims. The example embodiments, however, as well as a preferred mode of use, further objectives and descriptions thereof, will best be understood by reference to the following detailed description of an example embodiment of the present disclosure when read in conjunction with the accompanying drawings, wherein:

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

This disclosure seeks to provide a solution to problems that can arise when designing an attachment method for wings and/or control surfaces to aero vehicle structures when there is a large difference in thermal growth due to aerodynamic heating at high speeds. While material systems have been developed for dealing with high and low temperatures within major structural parts, joining these can be problematic. This disclosure describes a method using multiple flexible connection elements, such as flexible plates, along a line to form the connection between major structures, such as wings and fuselage, or fins and rocket bodies. The disclosed method could also be used to join parts in other fields, wherein the two parts have different thermal growth rates.

This disclosure provides a method for joining wings and or control surfaces to a payload cabin (fuselage) that allows for differential thermal growth between joint interfaces. The method uses a plurality of connection elements with flexibility in the chordwise direction, allowing for thermal growth of the wing. The geometry of the flexible connection elements is such that there is significantly more stiffness in the vertical and spanwise directions. A plurality of such flexible connection elements are used, each with a reduced overall load that can be reacted without the need of significant beam type spars. The loads are distributed among each location with an appropriately size connection element to the fuselage shell as its load path. By making these connection elements from relatively thin, flexible plates, changes in the length of the fuselage relative to the wing on vehicles with high aerodynamic heating can be accommodated through flexure of the thin plates. Metal alloys, typically with high nickel content could be used for the plate elements. These metal alloys have high temperature resistance whilst also having a much higher elastic and tensile modulus than other high temperature materials such as ceramics. The coefficient of thermal expansion of the aero parts will depend on the material. For example, a carbon composite will have a low coefficient of thermal expansion, while a metal will have a higher coefficient of thermal expansion. In some cases it may be beneficial to have many thin plate elements stacked together to improve buckling performance while maintaining flexibility. This could be accomplished by layering joint elements with ceramic fabric, felt or another material between them.

Figure 1:
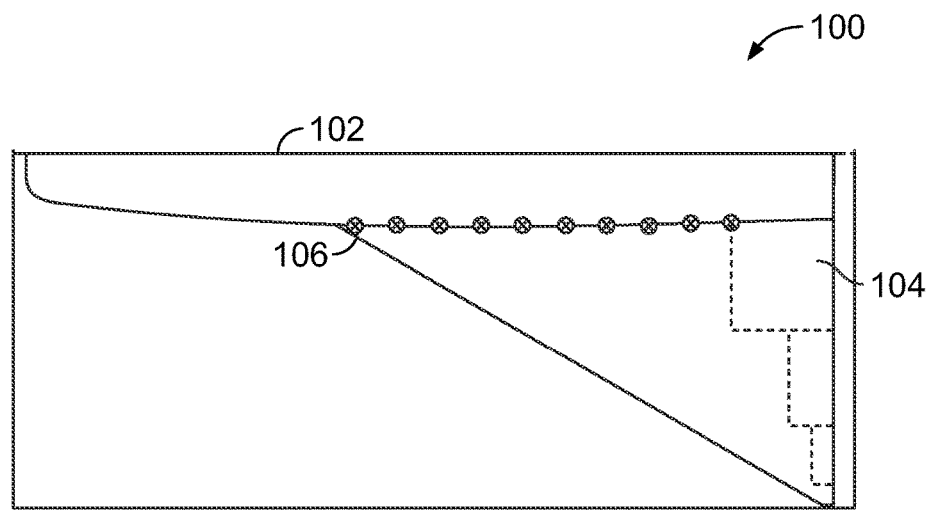
FIG. 1 is a diagrammic representation of a portion of an airplane showing a fuselage and a wing joined together using a method of the present disclosure.
Figure 2:
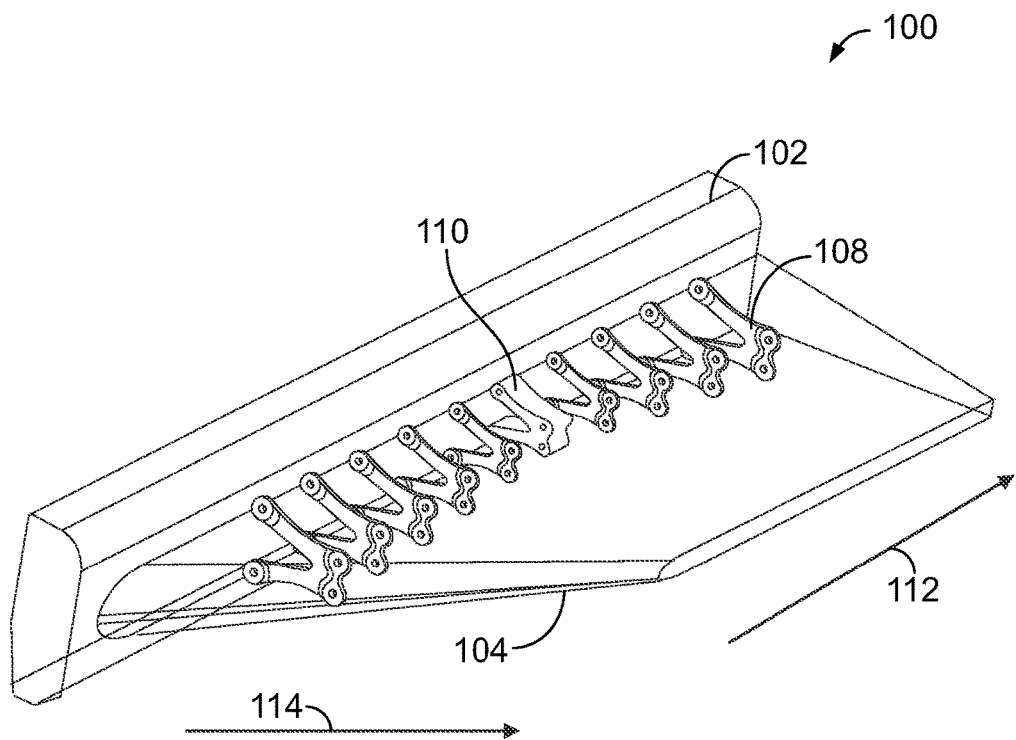
FIG. 2 is a diagrammic representation of a portion of an airplane showing a fuselage and a wing joined together with flexible connection elements using a method of the present disclosure.

FIGS. 1 and 2 show a portion of an airplane 100 with a first aerostructure part 102 and a second aerostructure part 104. The first aerostructure part 102 and the second aerostructure part 104 are joined at connection points 106. A method of joining the first aerostructure part 102 with the second aerostructure part 104 is provided. The second aerostructure part 104 may expand linearly at a greater rate when exposed to heat than the first aerostructure part 102, resulting in a difference in linear distance between the first aerostructure part 102 and the second aerostructure part 104. In an example embodiment, the first aerostructure part 102 may be an airplane fuselage and the second aerostructure part 104 may be an airplane wing, as shown in FIGS. 1 and 2. The first aerostructure part/airplane fuselage 102 may comprise metallic materials and the second aerostructure part/airplane wing 104 may comprise ceramic matrix composite material. In other embodiments, the second aerostructure part may be a control surface. In yet other embodiments, the first aerostructure part may be a rocket body and the second aerostructure part may be a fin.

The method may comprise aligning a plurality of connection elements in a linear array within the second aerostructure part 104. The connection elements may comprise a plurality of flexible connection elements 108 and at least one rigid connection element 110. The rigid connection element 110 may be located in between the flexible connection elements 108. For example the rigid connection element 110 may be located near the middle of the flexible connection elements 108. In other embodiments, the rigid connection element 110 may be located at an end of the linear array. In yet other embodiments, the rigid connection element 110 may be offset from the flexible connection elements 108. The rigid connection element 110 may include wires connecting the first aerostructure part 102 with the second aerostructure part 104. The method may further comprise attaching the first aerostructure part 102 to the second aerostructure part 104 at a plurality of connection points 106 with the plurality of connection elements. The flexible connection elements 108 may be configured to flex to accommodate for the difference in linear thermal growth between the first aerostructure part 102 and the second aerostructure part 104.

Figure 3A:
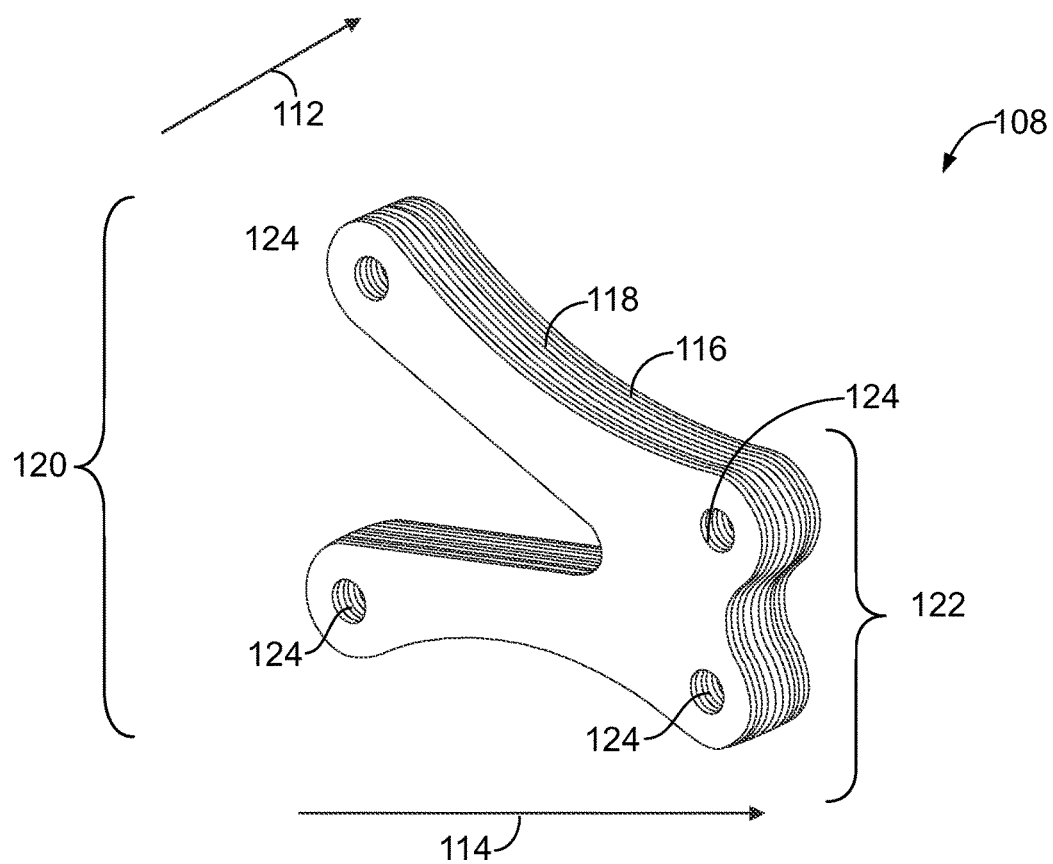
FIGS. 3a and 3b are diagrammic representations of a flexible connection element of the present disclosure.
Figure 3B:
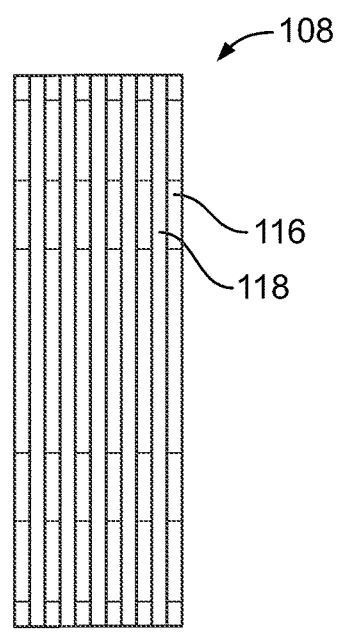

An example of a flexible connection element 108 of the present disclosure is shown in FIGS. 3a and 3b. The flexible connection elements 108 may be flexible plates. The flexible plates may each comprise at least one stack of plates 116. In an example embodiment, the flexible plates may comprise at least two stacks of plates 116 and a flexible spacer 118 between the stacks of plates 116 configured to prevent buckling of the flexible plates and to provide out-of-plane support (i.e. stabilizing the stacks such that more bending moment is required to buckle the stacks). The flexible plates may have an "A" shape profile, wherein the wider end 120 (the bottom of the "A") is attached to the first aerostructure part 102 and the narrower end 122 (the top of the "A") is attached to the second aerostructure part 104. The flexible connection elements 108 may connect the first aerostructure part 102 to the second aerostructure part 104 with fastener, for example, a clevis and pin joint. In other embodiments, the flexible plates may have an "X" shaped profile or be a truss-like member. Other shapes could also be used depending on the load requirements, wing thickness, and other factors as long as such shapes are flexible in the chordwise direction. The wider end 120 and the narrower end 122 may include a plurality of holes 124, which assist in attaching the first aerostructure part 102 to the second aerostructure part 104. The flexible connection elements 108 may comprise a metallic material, for example, nickel or titanium alloys. In considering which metal alloys to use, elastic modulus (stiffness), fatigue resistance, strength and weight at high temperatures, and other properties are considered. In other embodiments, the flexible connection elements 108 may comprise a ceramic material. The flexible spacer(s) 118 may comprise ceramic felt, ceramic fabric, metallic mesh, metallic sheet, polymer material (e.g., silicone), or any other material known in the art. The flexible connection elements 108 may be spaced at equal distances from each other. In other embodiments, the flexible connection elements 108 may be spaced at unequal distances from each other. The distance between the flexible connection elements 108 and the number of flexible connection elements 108 is determined by aircraft specific loads.

The rigid connection element 110 may be positioned such that the amount of flex in the plurality of flexible connection elements 108 is equalized on both sides of the rigid connection element 110. The rigid connection element 110 may be made of any material that can withstand high temperatures. The rigid connection element 110 may be arranged in a manner similar to a traditional wing-to-body joint arrangement, for example, as a bolted joint connection.

The method may further comprise aligning the plurality of flexible connection elements 108 such that the thinnest dimension of each flexible connection element 108 is in a chordwise direction 112 and the length of each flexible connection element 108 is aligned with a spanwise direction 114 of the airplane wing 104. The thinnest dimension of each flexible connection element 108 is defined by the layers of the flexible plates 116 and flexible spacers 118. The flexible connection elements 108 may be flexible in the chordwise direction 112 and rigid in other load directions.

Figure 4:
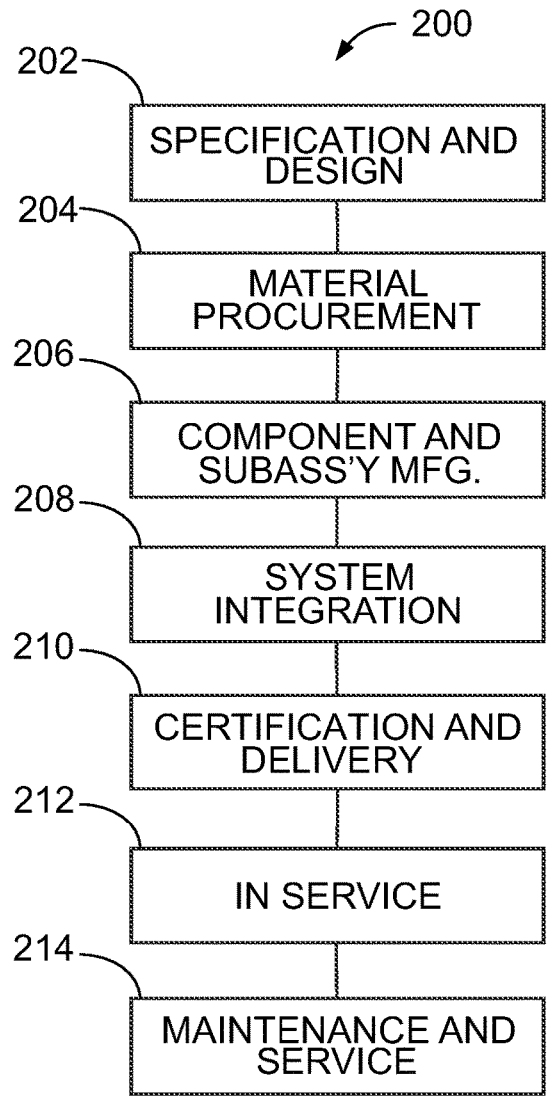
FIG. 4 is a diagrammic representation of a block diagram of an aircraft manufacturing and service method in accordance with an example embodiment.
Figure 5:
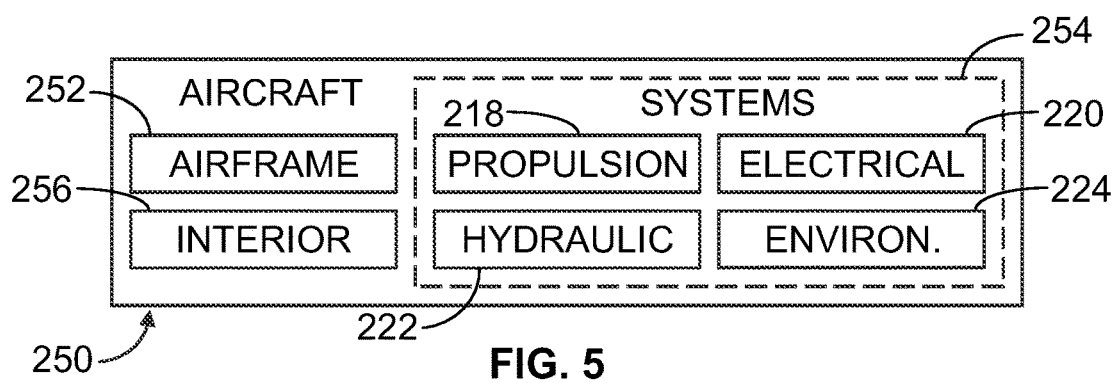
FIG. 5 is a diagrammic representation of a block diagram of an aircraft in which an example embodiment may be implemented.

Examples of the disclosure may be described in the context of an aircraft manufacturing and service method 200 as shown in FIG. 4 and an aircraft 250 as shown in FIG. 5. Turning first to FIG. 4, an illustration of an aircraft manufacturing and service method is depicted in accordance with an example. During pre-production, exemplary method 200 may include specification and design step 202 of the aircraft 250 in FIG. 5 and material procurement step 204.

During production, component and subassembly manufacturing step 206 and system integration step 208 of the aircraft 250 in FIG. 5 takes place. For example, the first aerostructure part 102 may be attached to the second aerostructure part 104 during step 206. Thereafter, the aircraft 250 in FIG. 5 may go through certification and delivery step 210 in order to be placed in service step 212. While in service by a customer, the aircraft 250 in FIG. 5 is scheduled for routine maintenance and service step 214 (which may also include modification, reconfiguration, refurbishment, and so on).

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

With reference now to FIG. 5, an illustration of an aircraft 250 is depicted in which an example may be implemented. In this example the aircraft 250 produced by exemplary method 200 in FIG. 4 and may include an airframe 252 with a plurality of high-level systems 254 and an interior 256. Examples of high-level systems 254 include one or more of a propulsion system 218, an electrical system 220, a hydraulic system 222, and an environmental system 224. In an example, the method of the present disclosure may be used to manufacture the air. Any number of other systems may be included. Although an aerospace example is shown, the principles of the disclosure may be applied to other industries, such as the automotive industry.

Systems and methods embodied herein may be employed during any one or more of the stages of the production and service method 200 in FIG. 4. For example, components or subassemblies corresponding to production step 206 may be fabricated or manufactured in a manner similar to components or subassemblies produced while the aircraft 250 is in service. Also, one or more apparatus examples, method examples, or a combination thereof may be utilized during the production step 206 and certification and delivery step 210, for example, by expediting assembly of or reducing the cost of an aircraft 250. Similarly, one or more of apparatus examples, method examples, or a combination thereof may be utilized while the aircraft 250 is in service, for example and without limitation, to maintenance and service 214.

EXAMPLES

In an illustrative example, the hypersonic vehicle in which the wing is to be attached to the fuselage is a reusable system with both take-off and landing capacity. The wing is approximately 11-17 inches thick with a thin and sharp leading edge (about 7.5 inches thick) and fixed trailing edges. The wing is made out of ceramic matrix composite type materials and the wing does not include TPS. The temperature of the wing during flight is about 1400 degrees Fahrenheit. The fuselage is made out of a metallic and organic composite material (e.g., steel, carbon/bismaleimide, aluminum) and is protected by TPS. The temperature of the fuselage during flight is about 400 degrees Fahrenheit. The coefficient of thermal expansion for the wing is between 1.5 and 4.5 ppm/degree Fahrenheit. The coefficient of thermal expansion for the fuselage is 1.5 ppm/degree Fahrenheit. Total shear is 240 k and moment is $25 \times 10^6$ in-lb. The length of the wing at the fuselage/wing interface is about 428 inches and the distance between connection points is about 13.9 inches. In this example, the length of the wing at the fuselage/wing interface expands between 0.90 inches and 2.70 inches and the distance between connection points expands between 0.03 inches and 0.09 inches. The flexible connection elements accommodate for this expansion by flexing in the chordwise direction.

The foregoing description of the specific embodiments will reveal the general nature of the disclosure so others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed is:

1. A method of joining a first aerostructure part with a second aerostructure part comprising
   aligning a plurality of connection elements in a linear array within the second aerostructure part, wherein the connection elements comprise a plurality of flexible connection elements and at least one rigid connection element, wherein the flexible connection elements are flexible plates, and
   attaching the first aerostructure part to the second aerostructure part at a plurality of connection points with the plurality of connection elements,
   wherein the second aerostructure part expands linearly at a greater rate when exposed to heat than the first aerostructure part resulting in a difference in linear distance between the first aerostructure part and the second aerostructure part, and wherein the flexible connection elements are configured to flex to accommodate for this linear distance difference,
   wherein the flexible plates comprise at least two stacks of flexible plates and wherein the flexible plates comprise a flexible spacer between the stacks of plates configured to prevent buckling of the flexible plates.

2. The method of claim 1, wherein the flexible plates have an "A" shape profile.

3. The method of claim 1, wherein the first aerostructure part is an airplane fuselage.

4. The method of claim 1, wherein the second aerostructure part is an airplane wing.

5. The method of claim 1, wherein the second aerostructure part is a control surface.

6. The method of claim 1, further comprising positioning the rigid connection element such that the amount of flex in the plurality of flexible connection elements is equalized on both sides of the rigid connection element.

7. The method of claim 4, further comprising aligning the plurality of flexible connection elements such that the thinnest dimension of the flexible connection element is in a chordwise direction of the airplane wing.

8. The method of claim 1, wherein the flexible connection elements are flexible in a chordwise direction and rigid in other load directions.

9. The method of claim 1, wherein the flexible connection elements comprise metallic material.

10. The method of claim 1, wherein the flexible connection elements comprise ceramic material.

11. A method of joining an airplane wing with an airplane fuselage comprising aligning a plurality of flexible plates and one rigid connection element in the airplane wing, such that the thinnest part of each flexible plate is aligned with a chordwise direction of the airplane wing and the length of each flexible plate is aligned with a spanwise direction of the airplane wing, and attaching the wing to the fuselage with the flexible plates and the rigid connection element at a plurality of connection points, wherein the rigid connection element connects the wing to fuselage at a fixed location, wherein the flexible plates flex to accommodate chordwise expansion of the airplane wing, and wherein the flexible plates resist vertical shear and bending moment, and wherein the flexible plates comprise at least two stacks of plates and wherein the flexible plates comprise a flexible spacer between the stacks of plates configured to prevent buckling of the flexible plates.

12. The method of claim 11, further comprising positioning the rigid connection element such that the amount of flex in the plurality of flexible plates is equalized on both sides of the rigid connection element.

13. The method of claim 11, wherein the airplane wing comprises ceramic matrix composite material and wherein the airplane fuselage comprises metallic materials.

14. The method of claim 11, wherein the plurality of flexible plates are A-shaped.

* * * * *